(12) United States Patent
Melakari et al.

(10) Patent No.: US 12,104,952 B1
(45) Date of Patent: Oct. 1, 2024

(54) CALIBRATION ARRANGEMENT, METHOD FOR CALIBRATING LIGHT INTENSITY READING AND A SYSTEM FOR DETERMINING GAZE DIRECTION

(71) Applicant: Pixieray Oy, Espoo (FI)

(72) Inventors: Klaus Melakari, Espoo (FI); Juha Timonen, Espoo (FI); Ari Pitkänen, Espoo (FI)

(73) Assignee: Pixieray Oy, Espoo (FI)

( * ) Notice: Subject to any disclaimer, the term of this patent is extended or adjusted under 35 U.S.C. 154(b) by 0 days.

(21) Appl. No.: 18/479,887

(22) Filed: Oct. 3, 2023

(51) Int. Cl.
*G01J 1/44* (2006.01)
*G02B 27/00* (2006.01)

(52) U.S. Cl.
CPC ............ *G01J 1/44* (2013.01); *G02B 27/0093* (2013.01); *G01J 2001/444* (2013.01)

(58) Field of Classification Search
CPC .... G01J 1/44; G01J 2001/444; G02B 27/0093
See application file for complete search history.

(56) References Cited

U.S. PATENT DOCUMENTS

| | | | |
|---|---|---|---|
| 10,832,051 B1* | 11/2020 | Trail | G06V 40/19 |
| 11,269,406 B1* | 3/2022 | Sztuk | G06F 3/011 |
| 2020/0327323 A1* | 10/2020 | Noble | G06T 7/20 |
| 2021/0088784 A1* | 3/2021 | Whitmire | G02B 27/0101 |

* cited by examiner

*Primary Examiner* — Thanh Luu
*Assistant Examiner* — Monica T Taba
(74) *Attorney, Agent, or Firm* — Ziegler IP Law Group LLC.

(57) ABSTRACT

A calibration arrangement to calibrate a light intensity reading includes a first light emitter to emit light, a first light receiver to receive the emitted light and generate an output signal and a controller to provide a first control signal to the first light emitter to emit a first light pulse during a first period of time, measure a first output signal, provide a second control signal to the first light emitter to emit a second light pulse during a second period of time, measure a second output signal, calculate a second difference between the first output signal and the second output signal and use the calculated second difference to calibrate the light intensity reading.

13 Claims, 4 Drawing Sheets

CALIBRATION ARRANGEMENT, METHOD FOR CALIBRATING LIGHT INTENSITY READING AND A SYSTEM FOR DETERMINING GAZE DIRECTION

TECHNICAL FIELD

The disclosure generally relates to gaze tracking and particularly to a calibration arrangement to calibrate a light intensity reading. The disclosure further relates to a method for calibrating light intensity reading. The disclosure also relates to a system for determining a gaze direction.

BACKGROUND

Gaze tracking is an important function that is performed as part of many modern applications, such as for displaying virtual objects in virtual-reality, augmented-reality and mixed-reality applications, interactive gaming and the like. Gaze tracking is important because determination of gaze direction of a wearer of a such a device enables to detect which direction the user is watching. Gaze information can be used to control devices such as a head-mounted display (HMD) or could be used to track gaze for controlling for example focus of active eyeglasses.

Among the myriad of techniques implemented for gaze tracking, light emitting diode (LED) had been extensively used due to their energy efficiency, longevity and precision. However, performing such gaze tracking through LED can be problematic for various reasons. For example, usage of the HMD for a prolonged period of time leads to an increase in temperature of one or more LEDs and/or photodiodes (PDs) employed in the HMD. As the temperature of the LEDs and/or PDs increases, several undesirable effects emerge such as reduction of light output, shift in wavelength of emitted light, latency issues and the like. Consequently, a deterioration of efficacy in gaze tracking is observed.

In light of the above discussion, it can be readily recognized that there exists an need to calibrate light intensity readings that can compensate for temperature-induced variances to enable accurate gaze tracking.

SUMMARY

An aim of the present disclosure is to provide a calibration arrangement to calibrate a light intensity reading and a method for calibrating the light intensity reading as defined in the appended independent claims to which reference is made to. The calibration arrangement and method enable accurate calibration of the light intensity reading associated with a light emitter (such as a light emitter employed in a gaze tracking arrangement). Such an accurate calibration of the light intensity reading enables accurate determination of a gaze direction of a user, for example, a wearer of a autofocus eye glasses. Consequently, accurate eye tracking allows for example to focus eye glasses in fast manner. Advantageous features are set out in the appended dependent claims.

Another aim of the present disclosure is to provide a system for determining a gaze direction. The system enables accurate determination of the gaze direction of a user. The direction of gaze can be used to control device or collect information related to the user (such as where the user is watching).

Throughout the description and claims of this specification, the words "comprise" and "contain" and variations of the words, for example "comprising" and "comprises", mean "including but not limited to", and do not exclude other components, integers or steps. Moreover, the singular encompasses the plural unless the context otherwise requires: in particular, where the indefinite article is used, the specification is to be understood as contemplating plurality as well as singularity, unless the context requires otherwise.

BRIEF DESCRIPTION OF DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
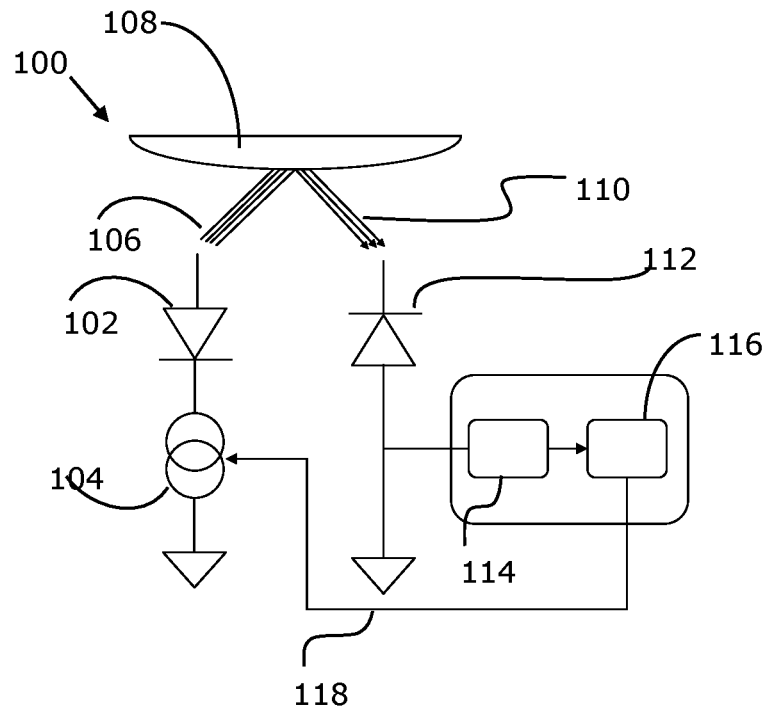
FIG. 1 is an illustration a diagram of a calibration arrangement as per one embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, the present disclosure provides a calibration arrangement to calibrate a light intensity reading. The calibration arrangement comprising:
  a first light emitter arranged to emit light;
  a first light receiver arranged to receive at least part of the emitted light and generate an output signal, wherein the generated output signal is a function of an intensity of the received light; and a controller configured to:
provide a first control signal to the first light emitter to emit a first light pulse during a first period of time (t0-t1);
measure a first output signal generated by the first light receiver during the first period of time (t0-t1);
provide a second control signal to the first light emitter to emit a second light pulse during a second period of time (t2-t3), wherein the second control signal is different from the first control signal by a first difference (P1-P2) and the second period of time (t2-t3) is after the first period of time (t0-t1);
measure a second output signal generated by the first light receiver during the second period of time (t2-t3);
calculate a second difference (I1-I2) between the first output signal and the second output signal; and
use the calculated second difference (I1-I2) to calibrate the light intensity reading (IM).

The term "calibration arrangement" as used throughout the present disclosure refers to an interconnected arrangement of electrical and/or electronic components to enable calibration of the light intensity reading. The term "light intensity reading" as used throughout the present disclosure refers to a numerical value associated with an amount of light received subsequent to transmission of the light.

The calibration arrangement comprises a first light emitter arranged to emit light. The term "light emitter" as used throughout the present disclosure relates to an electrical or electronic component capable of receiving a supply of electrical current as input and generating light as output, such that the generated light corresponds to a magnitude of the electrical current supplied to the light emitter. For example, the light emitter is an infrared light emitting diode (or "IR LED") capable of emitting infrared light. The term "infrared light" as used throughout the present disclosure relates to radiation having a wavelength between 780 nm and 1 mm.

The calibration arrangement further comprises a first light receiver arranged to receive at least part of the emitted light and generate an output signal. The term "light receiver" as used throughout the present disclosure refers to an electrical or electronic component capable of receiving the light emitted by the one or more light emitters to enable determination of an amount of light that is either directly emitted by the one or more light emitters or emitted by the one or more light emitters and then reflected from a reflective surface (such as from human eye, human skin and so forth) towards the light receiver. For example, the light receiver is an infrared photodiode (or "IR PD") capable of detecting infrared light emitted from an IR LED. The first light receiver receives at least part of the light emitted from the first light emitter. The term "at least part of the emitted light" refers to a subset or fraction of the light that is originally emitted from the first light emitter and subsequently reflected from a surface (such as eye of user), which is captured or received at the first light receiver. It will be appreciated that the light emitted from a light emitter is reflected from the eye of the user and skin surrounding the eye. Consequently, the amount of light received by a light receiver is dependent on various factors, including but not limited to, a position of the light receiver with respect to the light emitter, a distance of the light receiver from the eye and/or skin of the user, a skin tone of the user, an eye color of the eye of the user, presence of reflecting or occluding surfaces in a travel path of the emitted light and presence of reflecting or occluding surfaces in a travel path of the reflected light. For example, light emitted by a light emitter that is disposed below an eye of the user may not substantially reach the a light receiver disposed above the eye of the user due to presence of eye lids and/or eyelashes of the user whereas such light would be received by another light receiver disposed adjacently to the light emitter. The first light receiver generates an output signal. It will be appreciated that when reflected light hits the first light receiver, electrical signal in a form of voltage, current or a digital value is generated depending upon a type of the first light receiver and configuration thereof. For example, when the first light receiver is an IR PD, the generated output signal is photodiode current corresponding to the light received by the light receiver. The generated output signal is a function of an intensity of the received light. It will be appreciated that when the intensity of the received light is high, the generated output signal will be higher as compared to when the intensity of the received light is low. The term "intensity of light" as used throughout the present disclosure relates to an amount of energy carried by the light, such as, an amount of energy retained by the emitted light subsequent to reflection of the light. The intensity of the light changes due to various factors including but not limited to, inherent power associated with the light emitter, wavelength of the emitted light, interference or obstructions in a travel path of the light, travel distance of the light, travel medium of the light and so forth. The generated output signal is a "function of the intensity" such that a value of the generated output signal depends on the intensity of received light. Consequently, a change in the intensity of the reflected light corresponds to a change in the generated output signal. For example, when the first light receiver is an IR PD that the generates output signal (such as photodiode current) upon striking of the reflected light onto a surface of the photodiode, when a more amount of light or light having comparatively high intensity hits the first light receiver, the output signal having a higher value is generated. Similarly, when a less amount of light or light having comparatively lower intensity hits the first light receiver, the output signal having a lower value is generated. Thus, the generated output signal (such as photodiode current) is a direct function of the 'intensity of the light'.

Moreover, the calibration arrangement comprises a controller. The term "controller" as used throughout the present disclosure refers to an electrical or electronic component that is capable of receiving one or more inputs, processing the received one or more inputs to generate one or more outputs and subsequently, employing or transmitting the generated one or more outputs to control functioning of other components of the calibration arrangement. The calibration arrangement comprises a battery connected to the controller such that the battery supplies electrical current to the controller (and optionally, the first light emitter and the first light receiver) to enable operation of the controller. The controller is connected to the first light emitter and the first light receiver using wired or wireless connection. The controller is associated with current measurement circuitry that measures the received photodiode current. Subsequently, the current measurement circuitry converts the measured photodiode current to a corresponding digital value for further computing.

The controller is configured to provide a first control signal to the first light emitter to emit a first light pulse during a first period of time. The term "light pulse" as used throughout the present disclosure relates to each instance of light emission by a light emitter (such as the first light emitter), such that the emitted light is associated with specific intensity of the light. The controller provides the first control signal to the first light emitter, for example, as a first amount of electrical current supply to the first light emitter to enable emission of the first light pulse by the first light emitter such that the emitted first light pulse has a first intensity. The calibration arrangement comprises an adjustable current driver connected to the controller and the first light emitter (and optionally, the second, third, fourth, fifth and sixth light emitters). The term "adjustable current driver" refers to a device or circuitry that regulates and controls the amount of electrical current supplied to a load from a power source. The controller controls the adjustable current driver to provide the first amount of electrical current to the first light emitter to enable emission of the first light pulse. The adjustable current driver varies the electrical energy supplied to the first light emitter based on instructions from the controller to modulate the intensity of emitted light. For example, the first light pulse is associated with providing of 10 milli-Ampere (mA) of electrical current to the first emitter and the first light pulse is emitted for the first period of time, such as, for 2 micro-seconds. The controller is further configured to measure a first output signal generated by the first light receiver during the first period of time. The controller activates the first light receiver simultaneously with the emission of the first light pulse by the first light emitter such that the first light pulse that is reflected from the eye and/or the skin of the user is received by the first light receiver. In the above example, the controller activates the first light receiver for 2 to 5 micro-seconds to measure the first output signal associated with the first light pulse. The controller receives the photodiode current as the first output signal such that the photodiode current is associated with the first light pulse. It will be appreciated that for low-power applications such as gaze tracking, the received output signals are generally of lower intensity. For example, when the first light pulse is associated with providing of 10 milli-Ampere of electrical current to the first emitter, the first output signal is as low as 0.5 micro-Ampere. The photodiode current of the first output signal is measured using the current measurement circuitry. Subsequently, the measured photodiode current is converted to a corresponding digital value and then the digital value is stored. Optionally, the calibration arrangement comprises a memory connected to the controller. The controller stores the digital value associated with the first output signal in the memory.

Moreover, the controller is configured to provide a second control signal to the first light emitter to emit a second light pulse during a second period of time. The second control signal is different from the first control signal by a first difference and the second period of time is after the first period of time. Similarly, to the controller providing the first control signal to the first light emitter, the controller provides the second control signal to the first light emitter, for example, as a second amount of electrical current supplied to the first light emitter to enable emission of the second light pulse such that the emitted second light pulse has a second intensity. The second control signal is different from the first control signal by the first difference such that the second control signal is higher than the first control signal by a specific amount. For example, when the first light pulse is associated with providing of 10 milli-Ampere of electrical current to the first emitter, the second light pulse is associated with providing of 30 milli-Ampere of electrical current to the first emitter such that the first difference is 20 milli-Ampere. Optionally, the second control signal is lower than the first control signal. For example, when the first light pulse is associated with providing of 40 milli-Ampere of electrical current to the first emitter, the second light pulse is associated with providing of 30 milli-Ampere of electrical current to the first emitter such that the first difference is 10 milli-Ampere. Further, the second period of time is after the first period of time, such that the second control signal is either provided instantaneously after providing of the first control signal to the first light emitter or after passing of a particular time period after providing of the first control signal to the first light emitter. For example, the second control signal is provided for the second time period of 2 micro-seconds after passing of 5 to 20 micro-seconds after providing of the first control signal to the first light emitter. Further, a pause associated with the particular time period between the first light pulse and the second light pulse ensures that the second light pulse does not interfere with the reflected light of first light pulse, thereby, improvise accuracy associated with calibration of the first light emitter. However, providing the second control signal instantaneously after providing the first control signal enables to avoid changes in ambient factors between providing of the two control signals.

The controller is further configured to measure a second output signal generated by the first light receiver during the second period of time. The controller activates the second light receiver simultaneously with the emission of the second light pulse by the first light emitter such that the second light pulse that gets reflected from the eye and/or the skin of the user is received by the first light receiver. In the above example, the controller activates the first light receiver for 2 micro-seconds to measure the second output signal associated with the second light pulse. The controller receives the photodiode current as the second output signal such that the photodiode current is associated with the second light pulse. The current measurement circuitry measures the photodiode current of the second output signal and converts the measured photodiode current to a corresponding digital value and stores the digital value in the memory. In the above example wherein the second light pulse is associated with providing of 30 milli-Ampere of electrical current to the first emitter, the second output signal is 0.9 micro-Ampere.

It will be appreciated that values of the first and second amounts of electrical current corresponding to the first and second control signals, respectively, are merely exemplary and other values and/or value pairs can be provided without departing from a scope of the present disclosure. In one example, the first control signal is associated with supply of 20 milli-Ampere of electrical current and the second control signal is associated with supply of 30 milli-Ampere. In another example, the first control signal is associated with supply of 10 milli-Ampere of electrical current and the second control signal is associated with supply of 20 milli-Ampere of electrical current. In yet another example, the first control signal is associated with supply of 40 milli-Ampere of electrical current and the second control signal is associated with supply of 10 milli-Ampere of electrical current.

Moreover, the controller is configured to calculate a second difference between the first output signal and the second output signal. The term "second difference" as used throughout the present disclosure relates to difference in intensities associated the first light pulse and the second light pulse as received by the first light receiver during the first period of time and the second period of time, respectively. The controller receives or accesses the stored digital values of the first output signal and the second output signal, for example, from the memory and calculates the second difference between the first output signal and the second output signal.

The controller is further configured to use the calculated second difference to calibrate the light intensity reading. It will be appreciated that the light emitted by the first light emitter, i.e., the light intensity reading, deviates from a required light intensity reading associated with the first light emitter. For example, such a deviation is caused by an alteration of operating temperature of the first light emitter. The controller calibrates the light intensity reading associated with the first light emitter. Such a calibration of the light intensity reading associated with the first light emitter enables to ensure that the gaze direction of the wearer is detected accurately subsequent to performing of the calibration. The calibration of the light intensity reading enables nullification of effect of changes in temperature of the first light emitter. Further, continuous or periodical calibration of the light intensity reading associated with the first light emitter improves consistency, accuracy, and reliability of application of the first light emitter in various fields, such as, for gaze detection. Over all the first aspect provides fast and reliable manner to find relative (difference) values between receiving emitted light from the first light emitter to the first light receiver. This difference corresponds, based on experiments, to temperature induced error in the readings. As we know the difference we can calibrate the intensity readings to a correct value. Correct values are needed for applications such as gaze direction detection and a like.

It will be appreciated that the first period of time and the second period of time can be in a range of 5 nanoseconds to 500 microseconds. For example, the first period of time and the second period of time can be 5, 10, 15, 25, 50, 100, 200, 250, 350, 500, 700, 850, 900, 990 nanoseconds, to 1, 7, 9, 25, 57, 68, 99, 125, 145, 197, 278, 289, 326, 339, 362, 421, 450, 470, 489, 499 or 500 microseconds. The time difference between the first light pulse and the second light pulse can be nanoseconds to 100 microseconds. For example, the time difference can be 21, 30, 45, 55, 50, 120, 211, 262, 315, 502, 721, 868, 910, 999 nanoseconds, to 2, 8, 11, 24, 37, 44, 58, 69, 76, 82, 99 or 100 microseconds.

In one embodiment, the calculated second difference indicates a temperature of the first light emitter. It will be appreciated that during usage of the calibration arrangement, temperature of various components of the calibration arrangement increases, such as, due to conduction of heat from the skin of the user, convection of heat from environment surrounding the calibration arrangement, ambient radiation and the like. For example, the first light emitter is disposed closer to the skin of the wearer whereas the second light emitter is disposed comparatively farther away from the skin of the wearer. In such an example, the temperature of the first light emitter will be closer to a skin temperature of the wearer whereas the temperature of the second light emitter will be closer to an ambient temperature around the calibration arrangement. Consequently, the light intensity reading associated with the first light emitter will be different from the light intensity reading associated with the second light emitter owing to differences in the temperatures of the first light emitter and the second light emitter. Further, an IR LED can have strong temperature dependency of light intensity reading. For example, an IR LED emitting infrared light having a wavelength of 940 nm can experience more than 1% change in the light intensity reading per 1 Celsius change in temperature. Moreover, the light intensity reading also varies depending on a temperature of the light receiver receiving the emitted light. However, IR PDs are comparatively less sensitive to changes in temperature than IR LEDs. Also, a calibration arrangement can comprise multiple light emitters that are physically arranged in different spatial positions with respect to each other, such as, the first, second, third, fourth, fifth and sixth light emitters that are disposed along different positions. Further, each light emitter may experience a different amount of temperature change with respect to each other based on, for example, the temperature of the skin of the wearer and ambient temperature, thereby, increasing difficulty associated with determination of the temperature of each light emitter. The calculated second difference, i.e., the difference between the second output signal and the first output signal, indicates the temperature of the first light emitter. For example, the second difference indicates an amount of temperature change experienced by the first light emitter since commencement of operation of the calibration arrangement, such that an initial temperature of the first light emitter is taken to be approximately equal to the ambient temperature. The temperature of the first light emitter as indicated by the second difference enables the controller to adjust the amount of electrical current supplied to the first light emitter. The controller can thereby alter the amount of electrical current supplied based on the temperature to maintain a consistent light intensity reading associated with the first light emitter. Moreover, determination of the temperature of the first light emitter based on calculation of the second difference provides various advantages over determination of temperature by employing, for example, a temperature sensor. Such a determination of the temperature using the second difference eliminates a requirement of a dedicated temperature sensor, thereby enabling cost and size reduction associated with the calibration arrangement. It will be appreciated that a temperature sensor may exhibit latency due to thermal inertia during operation, thereby, being ineffective for time-dependent applications such as gaze tracking. Further, changes in temperature experienced by the first light emitter may be within a narrow range, such as, due to ambient temperature associated with a cold climate. Such a determination of the temperature within the narrow range would necessitate employment of sophisticated pulse control and detection techniques to achieve high accuracy associated with the temperature determination. However, the aforesaid techniques may be prone to experiencing degradation from external factors such as humidity, pressure and/or presence of corrosive elements. Consequently, determination of the temperature of the first light emitter through emission of light pulses and determination of the second difference, being less mechanical, is more resistant to such a degradation from external factors, thereby, enabling convenient, low-cost and accurate determination of the temperature of the first light emitter in a wide range of different applications and external factors.

The temperature of the first light emitter can be determined, for example, by employing a lookup table comprising previously identified relationships between the second difference and the temperature of the first light emitter (and optionally, the first light receiver) for various pairs of first and second control signals. Such a lookup table can be obtained, for example, by determining the second differences and temperatures for various pairs of first and second control signals in a factory line. The obtained lookup table can be stored in the memory. The controller can subsequently access the temperature of the first light emitter by employing the lookup table to automatically calibrate the light intensity reading of the first light emitter, thereby, enabling accurate tracking of gaze direction of the user. Optionally, the relationship between the second difference and the temperature of the first light emitter is obtained as a function based on the various pairs of first and second control signals. For example, when the first control signal is 10 milli-Ampere, the second control signal is 40 milli-Ampere and the second difference is 0.5 micro-Ampere, the temperature of the first light emitter is determined to be 30 Celsius (based on data of lookup table). In another example, when the first control signal is 10 milli-Ampere, the second control signal is 50 milli-Ampere and the second difference is 0.7 micro-Ampere, the temperature of the first light emitter is determined to be 10 Celsius. Such a determination of the temperature of the first light emitter by employing the second difference enables to calibrate the light intensity reading of the first light emitter without necessitating additional components such as temperature sensors that can be bulky, associated with high power consumption and would increase manufacturing and operating complexity associated with the gaze tracking arrangement. Consequently, the gaze tracking arrangement enables to improve convenience associated with determination of the temperature of the first light emitter and thereby, ensure accurate calibration of the light intensity reading associated with the first light emitter.

In another embodiment, the temperature of the first light emitter is used to determine a bias signal to be applied to a measurement control signal of the first light emitter to emit a measurement light pulse. The term "bias signal" as used throughout the present disclosure relates to a correction to a control signal that is provided by the controller to enable emission of a calibrated light pulse by the first light emitter. The term "measurement control signal" as used throughout the present disclosure relates to a control signal provided by the controller to the first light emitter during operation of the first light emitter to emit a light pulse, such as, for determining the gaze direction of the wearer. The controller employs the temperature of the first light emitter to determine the bias signal to be applied to the measurement control signal to obtain an accurate light intensity reading associated with the first light emitter. The bias signal can be applied by the controller, for example, by changing the amount of electrical current supplied by the controller to the first light emitter or by changing a voltage associated with the supplied current to cause emission of calibrated light pulse by the first light emitter. Such an application of the bias signal to the measurement control signal enables to quickly and conveniently overcome the temperature changes experienced by the first light emitter, thereby, ensuring accurate determination of the gaze direction of the wearer.

The temperature-based calibration of the light intensity reading of the first light emitter as discussed above plays a vital role in ensuring accuracy and consistency across various environmental and situational factors. Such a calibration not only counteracts intrinsic temperature effects of the first light emitter but also considers extraneous influences. For example, the skin temperature of the user can introduce discrepancies in readings, especially in close-proximity applications, such as a head-mounted display (referred to as "HMD" throughout a remainder of the present disclosure) or autofocus lenses/goggles/eye glasses. Similarly, ambient temperature variations, whether due to direct sunlight exposure, stark contrasts between a hot summer day and a cold winter day, or proximity to heat sources such as a radiator, can all substantially alter performance of the first light emitter. The calibration arrangement disclosed above neutralizes such temperature-induced variances associated with the first light emitter, enabling accurate and reliable use of the first light emitter for various applications such as gaze tracking. Optionally, the calibration arrangement can comprise a second, third, fourth, fifth and sixth light emitters in addition to the first light emitter. The controller applies different bias signals to the measurement control signals provided to each of the first, second, third, fourth, fifth and sixth light emitters, either simultaneously or sequentially. For example, the controller provides 10 milli-Ampere to the first light emitter, 12 milli-Ampere to the second light emitter and 9 milli-Ampere to the third light emitter based on the temperatures of the first light emitter, the second light emitter and the third light emitter, respectively. Consequently, the light intensity readings associated with each of the first light emitter, the second light emitter and the third light emitter will be calibrated to be equal, thereby enabling accurate determination of the gaze direction of the wearer.

In yet another embodiment, the temperature of the first light emitter is used to rectify a measurement output signal generated by the first light receiver. The term "measurement output signal" as used throughout the present disclosure relates to an output signal received by the first light receiver by emitting the calibrated light pulse by the first light emitter, such as, for determining the gaze direction of the wearer. The term "rectifies the measurement output signal" relates to adjustment or correction of the measurement output to counteract or eliminate errors introduced into calibration arrangement by factors such as temperature variations. The controller can utilize the temperature of the first light emitter to adjust an output signal received by the first light receiver. For example, when a temperature of 10 Celsius is determined to produce the measurement output signal that is higher by 0.2 micro-Ampere for the first light emitter, the controller receives the measurement output signal generated by the first light receiver and subsequently, rectifies the received measurement output signal by reducing 0.2 micro-Ampere from the measurement output signal to generate a calibrated measurement output signal. In such an example, when the received measurement output signal is 0.7 micro-Ampere, the controller rectifies the measurement output signal to generate the calibrated measurement output signal of 0.5 micro-Ampere. Optionally, the controller adaptively rectifies the measurement output signal generated by the first light receiver based on changes in temperature of the first light receiver. For example, when the temperature of 10 Celsius is determined to produce the measurement output signal that is higher by 0.2 micro-Ampere for the first light emitter, the controller rectifies the measurement output signal by reducing 0.2 micro-Ampere from the measurement output signal to generate the calibrated measurement output signal. After further usage of the calibration arrangement, when the temperature of Celsius is determined to produce the measurement output signal that is higher by 0.3 micro-Ampere for the first light emitter, the controller adaptively rectifies the measurement output signal by reducing 0.3 micro-Ampere from the measurement output signal to generate the calibrated measurement output signal.

In still another embodiment, the calculated second difference indicates a correction value to be used to correct the measurement output signal generated by the first light receiver. The term "correction value" as used throughout the present disclosure refers to an amount or factor that can be added, multiplied, divided or subtracted from measurement output signal to adjust for discrepancies, inaccuracies, or systemic errors observed in the initial light intensity reading. As discussed previously, the second difference is associated with the difference between intensities of the fight light pulse and the second light pulse. Consequently, the second difference indicates a deviation of the intensity of the generated light pulse from the intensity of a required light pulse. For example, the controller provides a same amount of electrical current as the control signal to emit a light pulse from multiple light emitters, such as, 10 milli-Ampere of electrical current to each of the first light emitter, the second light emitter and the third light emitter. Further, the second difference indicates an increase of 0.2 micro-Ampere between the first output signal and the second output signal for the first light emitter, a reduction of 0.3 micro-Ampere between the first output signal and the second output signal for the second light emitter and an increase of 0.4 micro-Ampere between the first output signal and the second output signal for the third light emitter. In such an example, the controller calibrates the first light emitter, the second light emitter and the third light emitter such that the measurement output signal associated with the first light emitter is corrected by reduction of 0.2 micro-Ampere, the measurement output signal associated with the second light emitter is corrected by increasing of 0.3 micro-Ampere and the measurement output signal associated with the third light emitter is corrected by reduction of 0.4 micro-Ampere. Such a correction can be performed by changing the amount of electrical current supplied by the controller to each of the first light emitter, the second light emitter and the third light emitter.

In a further embodiment, the light intensity reading indicates an amount of light emitted from the first light emitter to the first light receiver during a measurement cycle, either directly or via a reflection, and the calibrated light intensity reading indicates an adjusted light intensity reading that is adjusted by taking into account temperature induced deviations to the light intensity reading. The term "measurement cycle" as used throughout the present disclosure relates to a process of transmission of a light pulse from a light emitter towards the eyes of the wearer, transmission of the emitted light pulse or reflection of the emitted light pulse towards the light receiver, receiving of the reflected light by the light receiver and subsequent processing of the reflected light by the controller for calibrating the light intensity reading associated with the light emitter. Such a measurement cycle also encapsulates a period of time between emission of the light pulse and calibration of the light intensity reading of the light emitter by the controller. The term "calibrated light intensity reading" as used throughout the present disclosure relates to the adjusted light intensity reading associated with the light emitter. Such an adjustment is performed by the controller, such as, by processing temperature induced deviations to the light intensity reading and applying the bias signal to the measurement control signal, rectifying the measurement output signal, correcting the measurement output signal or a combination of the above to enable emission of accurate light pulses for determination of gaze direction of the wearer.

In a second aspect, the present disclosure provides a method for calibrating light intensity reading. The method comprises emitting a first light pulse during a first period of time and emitting a second light pulse during a second period of time. The controller enables supply of electrical current to the first light emitter during the first period of time and the second period of time, respectively to cause emission of the first light pulse and the second light pulse. The method further comprises measuring an intensity of light associated with each of the first light pulse and the second light pulse. The first light receiver is used to measure the intensity of light associated with each of the first light pulse and the second light pulse. The first light receiver generates a signal based on the intensity of the light of the respective light pulse. Moreover, the method comprises determining a difference between the measured light intensities. Such a determined difference corresponds to the second difference between the first output signal and the second output signal, as previously discussed. The controller analyses the generated signal for each pulse and determines second difference. The method further comprises emitting a measurement light pulse during a third period of time. The term "measurement light pulse" as used throughout the present disclosure relates to a light pulse emitted by the light emitter after calibration of the light intensity reading associated with the light emitter. Moreover, the method comprises measuring a light intensity reading associated with the measurement light pulse. Such a measured light intensity reading associated with the measurement light pulse corresponds to the calibrated light intensity reading. The method further comprises using the determined difference to calibrate the measured light intensity reading.

According to an embodiment, the calibrated light intensity readings are used to calibrate light intensity readings for a gaze tracking arrangement. The term "gaze tracking arrangement" refers to an arrangement of interconnected electrical and/or electronic components to detect a gaze direction of a user, such as, to detect where a wearer of an HMD comprising the gaze tracking arrangement is looking at any given point in time. Such a gaze tracking arrangement comprises one or more light emitters, one or more light receivers and a controller connected to each light emitter and each light receiver such that the controller controls an operation of each light emitter and each light receiver to determine the gaze direction of the wearer. In gaze tracking devices there are typically a set of light emitters and receivers spatially arranged around the gaze tracking device. In said devices it is likely that some of the components are different temperature from each other's. If gaze tracking is arranged with non calibrated components there can be significant errors on the tracking. Therefore the calibrated light intensity readings are important.

In a third aspect, the present disclosure provides a system for determining a gaze direction. The term "system for determining a gaze direction" refers to an arrangement of interconnected electrical and/or electronic components to detect a gaze direction of a user, such as, to detect where a wearer of an autofocus eye glasses (eye glasses which adapt depending on direction of gaze) comprising the gaze tracking arrangement is looking at any given point in time. Such a gaze tracking arrangement comprises one or more light emitters, one or more light receivers and a controller connected to each light emitter and each light receiver such that the controller controls an operation of each light emitter and each light receiver to determine the gaze direction of the wearer. The system comprises a set of light emitters arranged to emit measurement light pulses towards an eye. The system further comprises a set of light receivers arranged to receive at least part of the emitted measurement light that is reflected from the eye and to generate the light intensity readings. Moreover, the system comprises a calibration arrangement to calibrate the light intensity readings. The system further comprises a controller configured to use the calibrated light intensity readings to determine the gaze direction.

In one example, the system for determining the gaze direction comprises one or more light emitters and one or more light receivers. Such a gaze tracking system enables to detect a gaze direction of a user, such as, to detect where the users is looking at any given point in time. The system can system can comprise multiple light emitters. For example, the system comprises a first set of light emitters for detecting the gaze direction of right eye of the wearer and a second set of light emitters for detecting the gaze direction of left eye of the wearer. Further, each of the first set of light emitters and the second set of light emitters comprises multiple light emitters. For example, the first set of light emitters comprises the first light emitter disposed above the right eye of the wearer, a second light emitter disposed below the right eye towards a bottom left side and a third light emitter disposed below the right eye towards a bottom right side. Similarly, the second set of light emitters comprises a fourth light emitter disposed above the left eye of the wearer, a fifth light emitter disposed below the left eye towards a bottom left side and a sixth light emitter disposed below the left eye towards a bottom right side. Further, the first light emitter, the second light emitter and the third light emitter are disposed equidistantly from each other, such as, at a gap of 120° from each other. Similarly, the fourth light emitter, the fifth light emitter and the sixth light emitter are disposed equidistantly from each other, such as, at a gap of 120° from each other. The first light emitter (or alternatively, the second light emitter or the third light emitter) emits the light towards the right eye of the wearer in response to a specific amount of electrical current provided to the first light emitter. For example, the specific amount of electrical current is 10 milli-Ampere. Optionally, the fourth light emitter simultaneously emits light towards the left eye of the wearer.

The system further comprises multiple light receivers. For example, the system comprises a first set of light receivers corresponding to the first set of light emitters to enable detection of the gaze direction of the right eye of the wearer and a second set of light receivers corresponding to the second set of light emitters to enable detection of the gaze direction of the left eye of the wearer. Further, each of the first set of light receivers and the second set of light receivers comprise multiple light receivers. For example, the first set of light receivers comprises the first light receiver disposed adjacently to the first light emitter, a second light receiver disposed adjacently to the second light emitter and a third light emitter disposed adjacently to the third light emitter. Similarly, the second set of light receivers comprises a fourth light receiver disposed adjacently to the fourth light emitter, a fifth light receiver disposed adjacently to the fifth light emitter and a sixth light receiver disposed adjacently to the sixth light emitter.

The system further comprises a controller connected to each of the first, second, third, fourth, fifth and sixth light emitters and light receivers. The controller calibrates the light intensity reading for each of the of the first, second, third, fourth, fifth and sixth light emitters, such as, in a manner discussed with respect to the first light emitter above. The calibration of the light intensity readings associated with each of the first, second, third, fourth, fifth and sixth light emitters enables to accurately detect the gaze direction of the wearer. Such an accurate detection of the gaze direction of the wearer enables to accurately detecting which way the user is watching, thereby, improving user experience and functionality of the system. As per one embodiment, the light intensity readings are calibrated by adjusting a control signal of each of the light emitters of the set of light emitters with a respective bias signal. The control signal can be adjusted by changing the amount of electrical current supplied to each of the light emitters of the set of light emitters by controlling the operation of the adjustable current driver. Further, the bias signal relates to a signal to increase or decrease the amount of current supplied to each of the light emitters of the set of light emitters, for example, based on a temperature of each of the light emitters of the set of light emitters.

The first output signal and the second output signal generated by first light receiver can indicate interaction of light with surface (such as, eyeball of the user). These signals can be associated with direct emission and reception of light or any combination of reflection, absorption, or diffraction of light prior to reception thereof.

In another embodiment, the first light receiver can be arranged in travel path of the emitted light. The system can comprise a first light emitter and the first light receiver. The first light receiver can be disposed rectilinearly with respect to the first light emitter such that light emitted by the first light emitter is directly received by the first light receiver without the emitted light undergoing substantial reflection, refraction, diffraction and the like. The controller causes emission of a first light pulse and a second light pulse by the first light emitter such that the first light receiver obtains a first output signal and a second output signal, respectively. Subsequently, the controller calculates the second difference based on the obtained first output signal and the second output signal such that the temperature of the first light emitter is associated with the second difference.

As per another embodiment, the light intensity readings are adjusted by correcting the generated light intensity readings with respective correction values.

As per yet another embodiment, the light intensity readings are calibrated using the calibration arrangement as previously described.

As per still another embodiment, the controller is configured to calibrate the light intensity readings as previously described.

In summary the system (which can be for example autofocus eye glasses) which has described calibration arranged works in various ambient temperature environments and can take in account that some parts of the system might be hotter than others.

DETAILED DESCRIPTION OF DRAWINGS

Referring to FIG. 1, there is shown a diagram of a calibration arrangement 100 as per one embodiment of the present disclosure. The calibration arrangement 100 comprises a first light emitter 102 (such as an IR LED). The first light emitter 102 is connected to an adjustable current driver 104 that changes an amount of electrical current supplied to the first light emitter 102.

In a first phase, the first light emitter 102 emits a first light pulse 106 (for a first period of time) towards a reflective surface 108 (such as eye of user of the calibration arrangement 100). The emitted light pulse 106 is reflected from the reflective surface 108 such that reflected light 110 is received by a first light receiver 112 (such as an IR PD). The first light is receiver 112 is connected to current measurement circuitry 114 that generates first output signal (such as photodiode current) associated with the reflected light 110.

In second phase, the first light emitter 102 emits a second light pulse (similar to the first light pulse 106) for a second period of time, wherein the second light pulse is different from first light pulse 106. The emitted second light pulse is reflected from the reflective surface 108. The first light receiver 112 receives the reflected light from reflective surface 108 in response to the second light pulse. The current measurement circuitry 114 generates a second output signal. The controller 116 computes second difference between the generated first output signal and the second output signal to calibrate the light intensity reading (IM) of the first light emitter 102. The controller 116 provides a control signal 118 based on the calibrated light intensity reading to emit a calibrated light pulse from the first light emitter 102.

Figure 2:
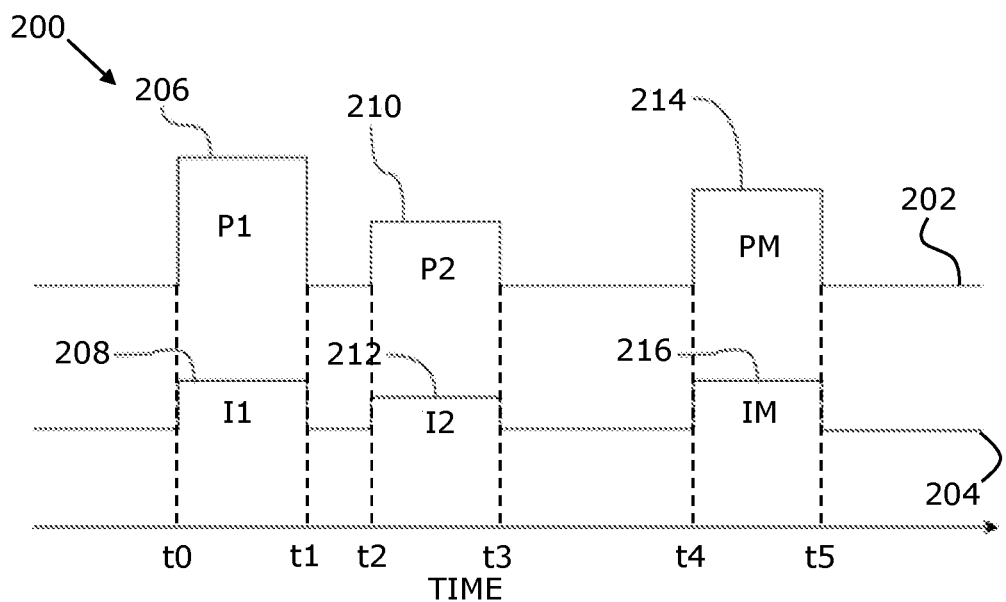
FIG. 2 is an illustration a timing graph describing a relationship between a timing at which pulsed light is emitted by a light source according to one embodiment of the present disclosure.

Referring to FIG. 2, there is shown a time graph 200 describing a relationship between a timing at which pulsed light is emitted by a light source according to one embodiment of the present disclosure. Curve 202 relates to intensity of light pulses emitted by the light emitter and curve 204 relates to intensity of reflected light received by the light receiver. The light emitter emits a first light pulse 206 with intensity P1 in a first period of time t0-t1 and in response, the light receiver receives reflected light 208 having intensity I1. The light emitter then emits a second light pulse 210 having intensity P2 in a second period of time t2-t3 and in response, the light receiver receives reflected light 212 having intensity I2. The controller calculates first difference P1-P2 and second difference I1-I2, wherein the second difference I1-I2 is indicative of a temperature of the light emitter. The second difference I1-I2 can be used as correction value factor to calibrate the light intensity reading (IM) of emitter. As differences between the two signals are taken into account to calculate the correction factor, the present disclosure may reduce or eliminate any systematic errors or offsets in the measurement of the emitted light. The controller regulates operating parameters (e.g., magnitude electrical current supplied to the light emitter) to enable emission of a calibrated light pulse 214 having intensity PM and the light receiver receives calibrated light intensity reading 216 associated with intensity IM. Such a calibrated light pulse 214 and calibrated light intensity reading 216 is employed to determine gaze direction of a wearer.

Figure 3:
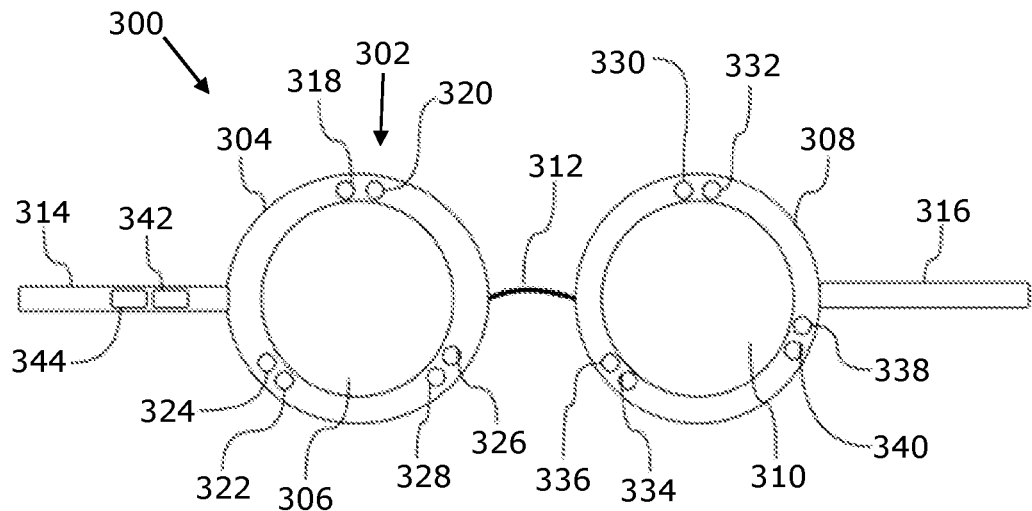
FIG. 3 is an illustration system for determining a gaze direction as per one embodiment of the present disclosure.

Referring to FIG. 3, there is shown a system 300 for determining a gaze direction as per one embodiment of the present disclosure. The system 300 comprises a right frame 304 for receiving a right lens 306 for right eye of a wearer. The system 300 also comprises a left frame 308 for receiving a left lens 310 for left eye of the wearer. The left frame 304 and the right frame 308 are connected by a bridge 312 that rests on nose of the wearer during use. The right frame 304 comprises a right temple 314 that supports on right ear of the wearer and a left temple 316 that supports on left ear of the wearer.

The calibration arrangement 302 comprises a first light emitter 318 to emit light towards the right eye of the wearer and a first light receiver 320 arranged to receive at least part of the light emitted by the first light emitter 318. Further, the calibration arrangement 302 comprises a second light emitter 322 and a second light receiver 324 as well as a third light emitter 326 and a third light receiver 328 arranged to emit and receive the emitted light, respectively, to enable determination of gaze direction of the left eye.

Similarly, the calibration arrangement 302 comprises a fourth light emitter 330, a fourth light receiver 332, a fifth light emitter 334, a fifth light receiver 336, a sixth light emitter 338 and a sixth light receiver 340 arranged to emit and receive the emitted light, respectively, to enable determination of gaze direction of the right eye. The gaze tracking arrangement can comprise a set of light emitters selected from the first light emitter 318, the second light emitter 322, the third light emitter 326, the fourth light emitter 330, the fifth light emitter 334 and the sixth light emitter 338. Similarly, the gaze tracking arrangement can comprise a set of light receivers selected from the first light receiver 320, the second light receiver 324, the third light receiver 328, the fourth light receiver 332, the fifth light receiver 336 and the sixth light receiver 338. It would be appreciated that person ordinarily skill in art can deploy any number of pairs of light emitters and light receivers within the gaze tracking arrangement.

The calibration arrangement 302 further comprises a controller 342 connected to each of the first light emitter 318, the first light receiver 320, the second light emitter 322, the second light receiver 324, the third light emitter 326, the third light receiver 328, the fourth light emitter 330, the fourth light receiver 332, the fifth light emitter 334, the fifth light receiver 336, the sixth light emitter 338 and the sixth light receiver 340 to control operation of the aforesaid components. The calibration arrangement 302 also comprises a battery 344 connected to each of the first light emitter 318, the first light receiver 320, the second light emitter 322, the second light receiver 324, the third light emitter 326, the third light receiver 328, the fourth light emitter 330, the fourth light receiver 332, the fifth light emitter 334, the fifth light receiver 336, the sixth light emitter 338, the sixth light receiver 340 and the controller 342 to provide electrical current for operation of the aforesaid components. The controller 342 activates, in sequential manner, for a first time period, the first light emitter 318, the second light emitter 322 and the third light emitter 326 to emit a first light pulse from each of the aforesaid components. Each of the first light receiver 320, the second light receiver 324 and the third light receiver 328 generates the first output signal based on received at least part (such as reflected light) of emitted first light pulse. Then, after passage of particular time period (such as 50 nanoseconds) after the first time period, the controller 342 activates, in sequential manner, for a second time period, first light emitter 318, second light emitter 322 and third light emitter 326 to emit second light pulse. Each of the first light receiver 320, the second light receiver 324 and the third light receiver 328 generates the second output signal based on received at least part (such as reflected light) of emitted second light pulse. The controller 342 analyzes the generated first output signal and the second output signal to determine correction value for each of the first light emitter 318, the second light emitter 322 and the third light emitter 326. The determined correction value is used to calibrate the light intensity readings of the first light emitter 318, the second light emitter 322 and the third light emitter 326. Further, the controller 342 analyzes output signal that denotes pattern (e.g., distribution light photon across the receiver surface), intensity, and angle of the reflected light to determine gaze direction of user.

Figure 4:
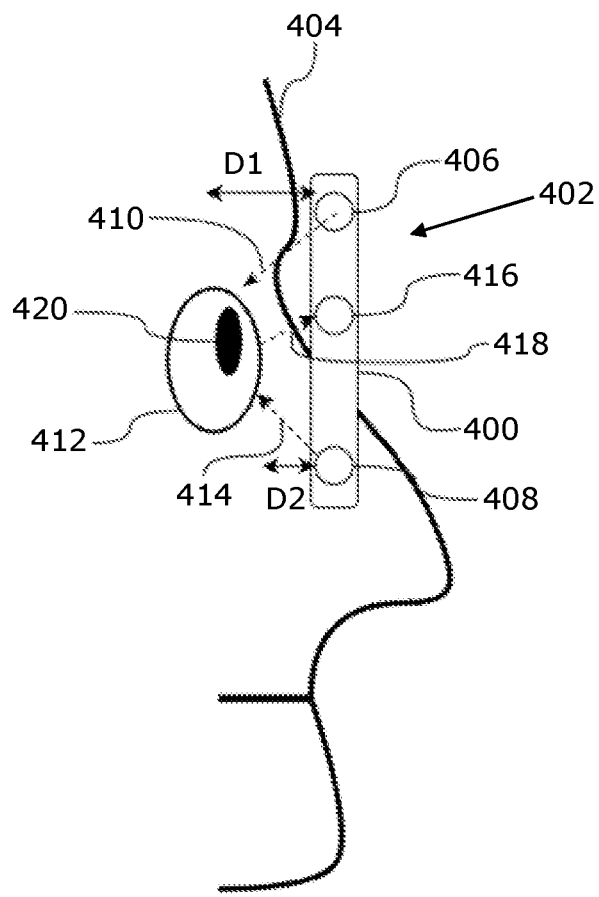
FIG. 4 is an illustration a right-side view of an eyewear comprising a calibration arrangement that is worn by a wearer according to one embodiment of the present disclosure.

Referring to FIG. 4, there is shown a right-side view of an eyewear 400 comprising a calibration arrangement 402 that is worn by a wearer 404 according to one embodiment of the present disclosure. The calibration arrangement 402 comprises a first light emitter 406 disposed at a distance of D1 from skin of the wearer 404 and a second light emitter 408 disposed at a distance of D2 from skin of the wearer 404. As shown, D2 is shorter than D1. The first light emitter 406 emits a light pulse 410 towards right eye 412 of the wearer 404 and the second light emitter 408 emits a light pulse 414 towards the right eye 412 of the wearer 404. The calibration arrangement 402 further comprises a first light receiver 416 vertically disposed between the first light emitter 406 and the second light emitter 408. The first light receiver 416 receives light 418 that is reflected from the right eye of the wearer 404 to enable determination of gaze direction associated with right eyeball 420 of the wearer 404.

Figure 5:
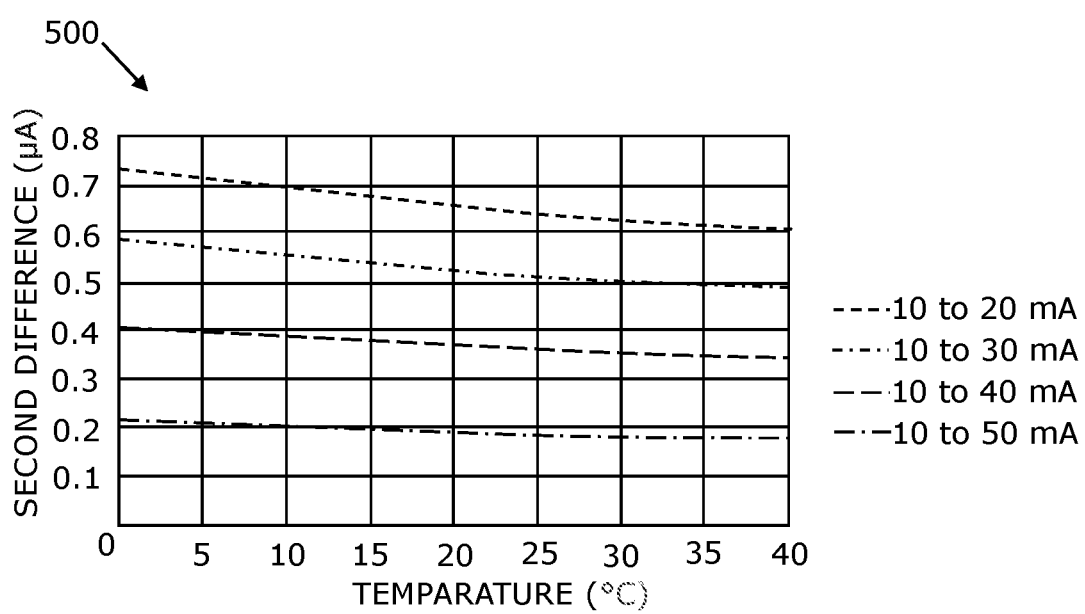
FIG. 5 is an illustration a graph illustrating standard curves representing relationship between the temperature of light emitter and the difference in intensities of two emitted pulses as per one embodiment of the present disclosure.

Referring to FIG. 5, there is shown a graph 500 illustrating standard curves representing relationship between the temperature of light emitter and the difference in intensities of two emitted pulses as per one embodiment of the present disclosure. These standard curves are generated based on determination of the difference in intensities of first and second control emitted pulse as function of temperature in a controlled environment. The standard curve is employed for determining the temperature of the light emitter for different sets of light pulses emitted by the light emitter.

Figure 6:
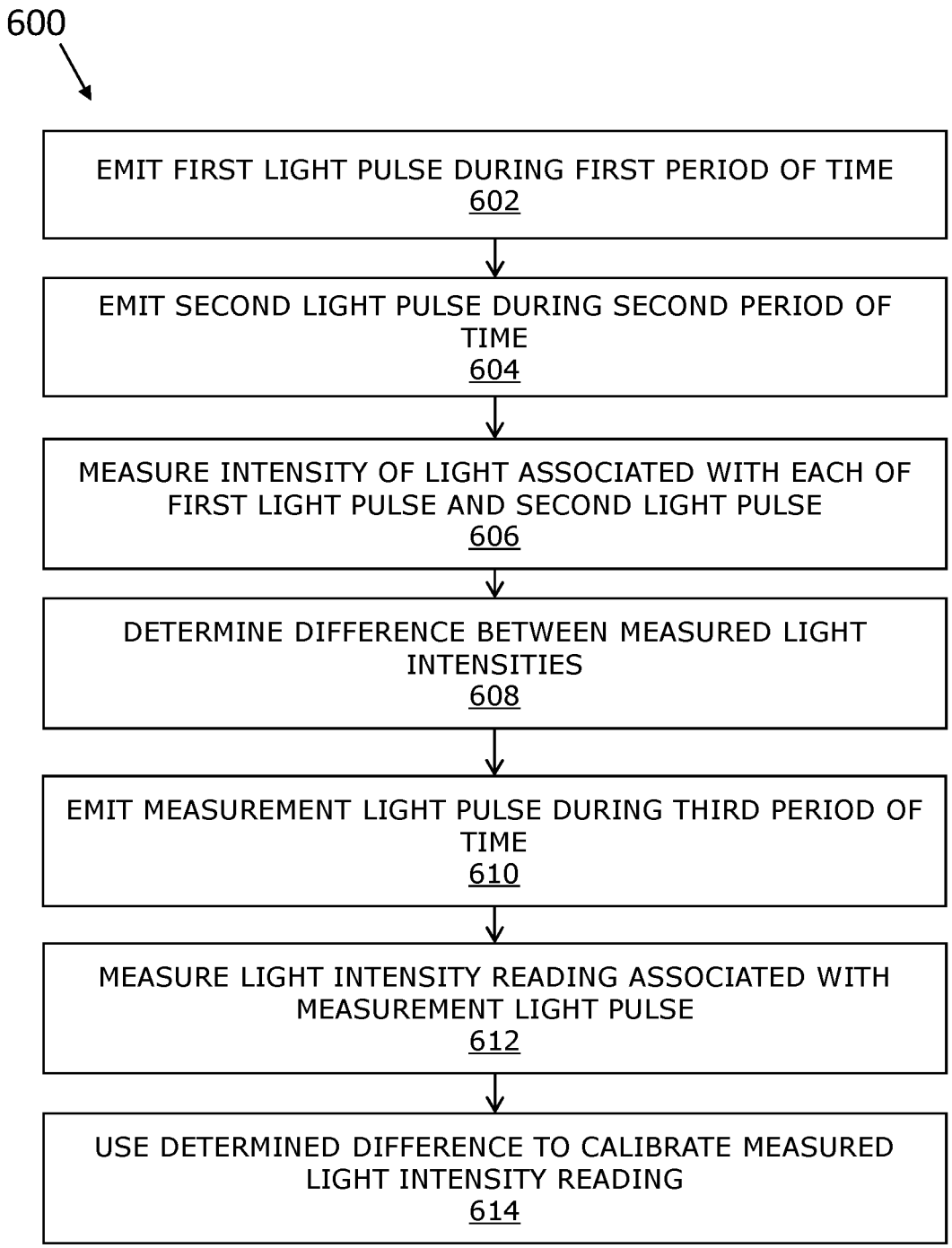
FIG. 6 is an illustration a flowchart illustrating steps of a method for calibrating light intensity reading according to one embodiment of the present disclosure.

Referring to FIG. 6, there is shown a flowchart 600 illustrating steps of a method for calibrating light intensity reading according to one embodiment of the present disclosure. At a step 602, a first light pulse is emitted during a first period of time. At a step 604, a second light pulse is emitted during a second period of time. At a step 606, an intensity of light associated with each of the first light pulse and the second light pulse is measured. At a step 608, a difference between the measured light intensities is determined. At a step 610, a measurement light pulse is emitted during a third period of time. At a step 612, a light intensity reading associated with the measurement light pulse is measured. At a step 614, the determined difference is used to calibrate the measured light intensity reading.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A calibration arrangement to calibrate a light intensity reading, the calibration arrangement comprising:
    a first light emitter arranged to emit light;
    a first light receiver arranged to receive at least part of the emitted light and generate an output signal, wherein the generated output signal is a function of an intensity of the received light; and
    a controller configured to:
    provide a first control signal to the first light emitter to emit a first light pulse during a first period of time;
    measure a first output signal generated by the first light receiver during the first period of time;
    provide a second control signal to the first light emitter to emit a second light pulse during a second period of time, wherein the second control signal is different from the first control signal by a first difference and the second period of time is after the first period of time;
    measure a second output signal generated by the first light receiver during the second period of time;
    calculate a second difference between the first output signal and the second output signal; and
    use the calculated second difference to calibrate the light intensity reading.

2. The calibration arrangement according to claim 1, wherein the calculated second difference indicates a temperature of the first light emitter.

3. The calibration arrangement according to claim 2, wherein the temperature of the first light emitter is used to determine a bias signal to be applied to a measurement control signal of the first light emitter to emit a measurement light pulse.

4. The calibration arrangement according to claim 2, wherein the temperature of the first light emitter is used to rectify a measurement output signal generated by the first light receiver.

5. The calibration arrangement according to claim 4, wherein the calculated second difference indicates a correction value to be used to correct the measurement output signal generated by the first light receiver.

6. The calibration arrangement according to claim 1, wherein the light intensity reading indicates an amount of light emitted from the first light emitter to the first light receiver during a measurement cycle, either directly or via a reflection, and the calibrated light intensity reading indicates an adjusted light intensity reading that is adjusted by taking into account temperature induced deviations to the light intensity reading.

7. A method for calibrating light intensity reading, the method comprising:
    emitting a first light pulse during a first period of time;
    emitting a second light pulse during a second period of time;
    measuring an intensity of light associated with each of the first light pulse and the second light pulse;
    determining a difference between the measured light intensities;
    emitting a measurement light pulse during a third period of time;
    measuring a light intensity reading associated with the measurement light pulse; and
    using the determined difference to calibrate the measured light intensity reading.

8. The method according to claim 7, wherein the calibrated light intensity readings are used to calibrate light intensity readings for a gaze tracking arrangement.

9. A system for determining a gaze direction, the system comprising:
    a set of light emitters arranged to emit measurement light pulses towards an eye;
    a set of light receivers arranged to receive at least part of the emitted measurement light that is reflected from the eye and to generate the light intensity readings;
    a calibration arrangement to calibrate the light intensity readings; and
    a controller configured to use the calibrated light intensity readings to determine the gaze direction,
    wherein the controller is further configured to:
    provide a first control signal to the first light emitter to emit a first light pulse during a first period of time;
    measure a first output signal generated by the first light receiver during the first period of time;
    provide a second control signal to the first light emitter to emit a second light pulse during a second period of time, wherein the second control signal is different from the first control signal by a first difference and the second period of time is after the first period of time;
    measure a second output signal generated by the first light receiver during the second period of time;
    calculate a second difference between the first output signal and the second output signal; and
    use the calculated second difference to calibrate the light intensity reading.

10. The system according to claim 9, wherein the light intensity readings are calibrated by adjusting a control signal of each of the light emitters of the set of light emitters with a respective bias signal.

11. The system according to claim 9, wherein the light intensity readings are adjusted by correcting the generated light intensity readings with respective correction values.

12. The system according to claim 9, wherein the light intensity readings are calibrated using the calibration arrangement.

13. The system according to claim 9, wherein the controller is configured to calibrate the light intensity readings.

\* \* \* \* \*